July 17, 1923.

E. O. FELLROTH

TIRE GAUGE CUTTER

Filed March 7, 1922

Inventor
ERICK O. FELLROTH

By Paul Paul
ATTORNEY

July 17, 1923.

E. O. FELLROTH

TIRE GAUGE CUTTER

Filed March 7, 1922  2 Sheets-Sheet 2

1,462,198

Inventor
ERICK O. FELLROTH
By Paul & Paul
ATTORNEYS

Patented July 17, 1923.

1,462,198

UNITED STATES PATENT OFFICE.

ERICK O. FELLROTH, OF MINNEAPOLIS, MINNESOTA, ASSIGNOR OF ONE-THIRD TO FREDERICK N. HEGG AND ONE-THIRD TO CARL I. LINDSKOOG, BOTH OF MINNEAPOLIS, MINNESOTA.

TIRE GAUGE CUTTER.

Application filed March 7, 1922. Serial No. 541,801.

*To all whom it may concern:*

Be it known that I, ERICK O. FELLROTH, a citizen of the United States, resident of Minneapolis, county of Hennepin, State of Minnesota, have invented certain new and useful Improvements in Tire Gauge Cutters, of which the following is a specification.

The object of my invention is to provide a machine by means of which a discarded or worn tire shoe or casing can be cut transversely into a series of independent sections to be afterwards joined together by a flexible means and used on a wheel tire to serve as a guard or protector therefor.

A further object is to provide a machine adapted particularly for cutting tires transversely which have no reinforcing wires in their beads or lips.

Other objects of the invention will appear from the following detailed description.

The invention consists generally in various constructions and combinations, all as hereinafter described and particularly pointed out in the claims.

In the accompanying drawings forming part of this specification,

Figure 1:
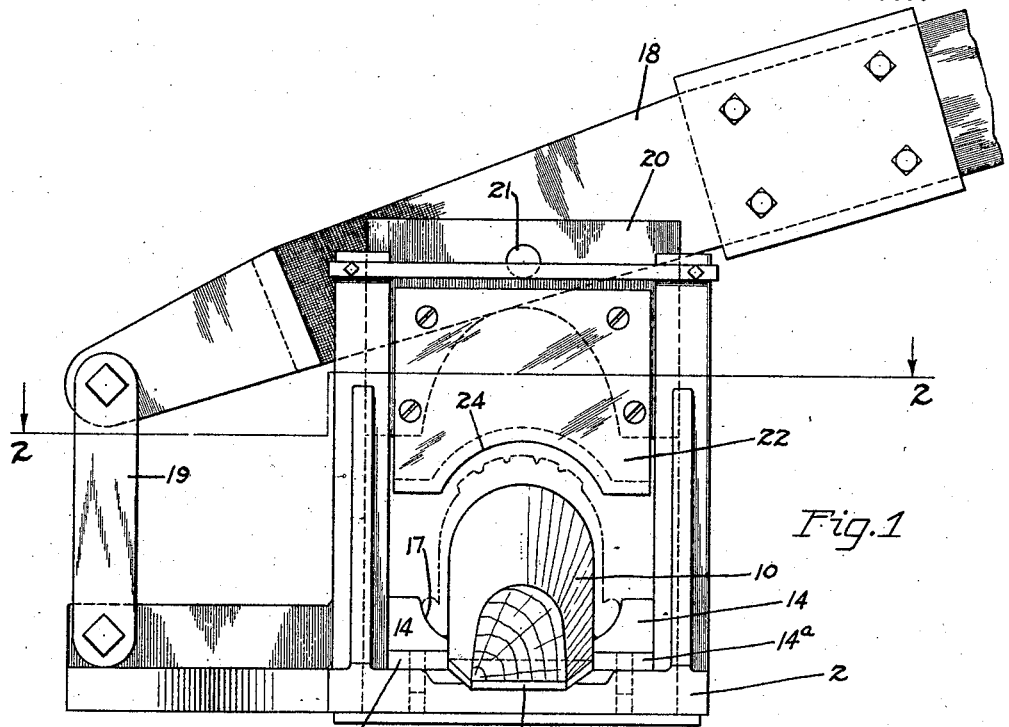
Figure 1 is a side view of a tire guard cutter embodying my invention.
Figure 2:
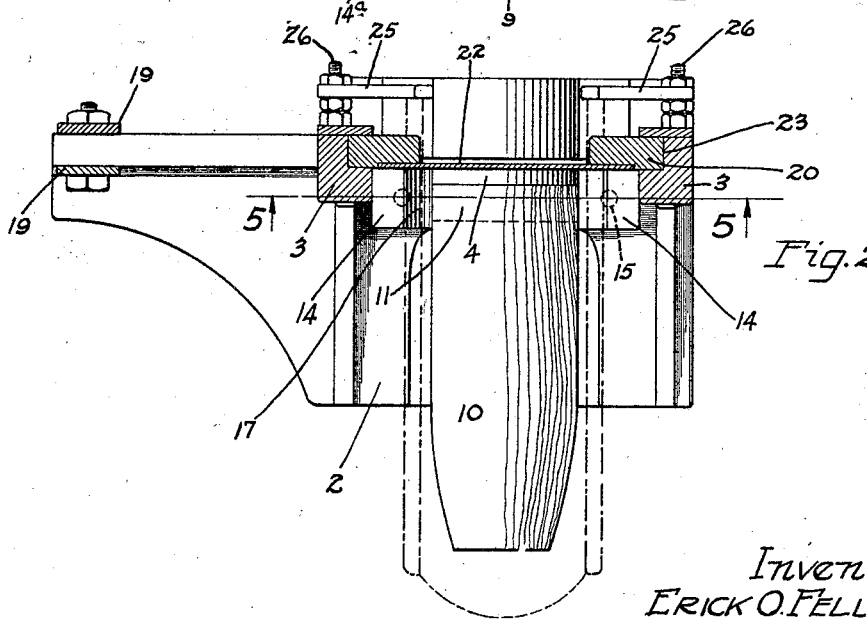
Figure 2 is a sectional view on the line 2—2 of Figure 1.
Figure 5:
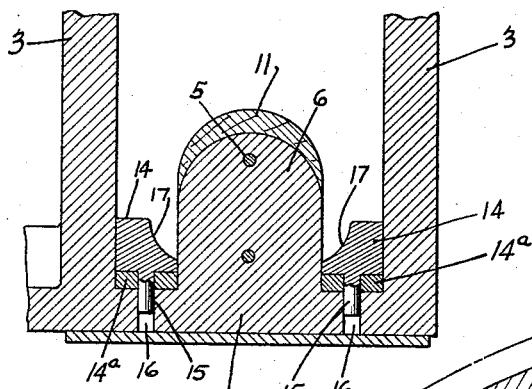
Figure 5 is a detail sectional view showing the base and the support to which the saddle supporting the tire to be cut is secured.
Figure 4:
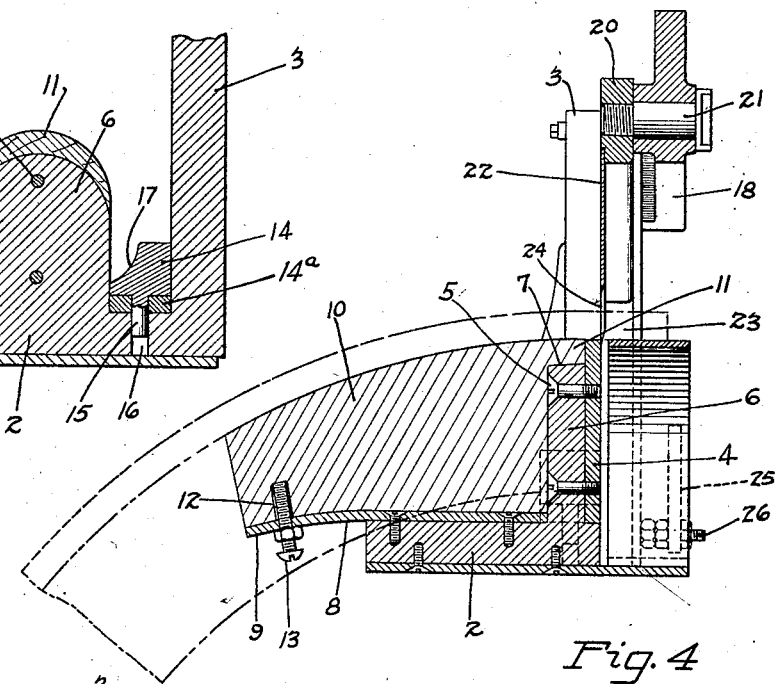
Figure 4 is a vertical sectional view.
Figure 3:
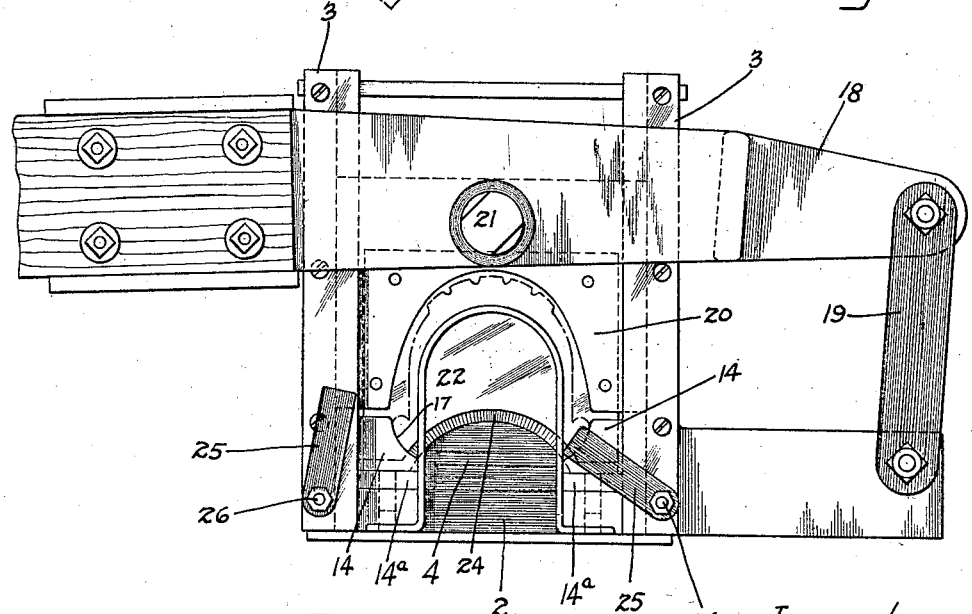
Figure 3 is a view on the opposite side of the machine from the view shown in Figure 1.

In the drawing, 2 represents a suitable base, and 3 upright standards thereon. 4 is a guide plate arranged vertically between the standards and secured thereto, preferably by screws 5. 6 is a block, the upper end of said block terminating below the corresponding end of the plate 4 and forming a shoulder 7. A plate 8 is secured to the base 2 and has a slightly curved outer end 9 and a block or saddle 10, preferably of wood, seated on the plate 8, has a tongue 11 that rests upon the shoulder 7 and is butted against the plate 4 and also has contact with the vertical outer face of the block 6. A socket 12 is provided in the underside of the block to receive an adjustable screw 13 which serves to hold the block in place, slight tilting thereof being accomplished by the adjustment of the screw.

The tire to be cut is placed over the saddle 10 with the portion to be sheared off projecting beyond the plate 4, which serves as a guide for the cutting knife. Blocks 14 and 14$^a$ are inserted between the standards 3 and the plate 4, and pins 15 project from the blocks through the blocks 14 into sockets 16 in the base for holding both the blocks in place. For a large size tire, the blocks 14$^a$ are removed and the blocks 14 set directly on the base, allowing the tire to fit snugly over the guide plate 4, with the beads resting on the curved surfaces 17. Blocks of various thickness may be used and removed, as desired.

A lever 18 has a link 19 pivotally connecting one end thereof with the base and a plate 20 is mounted on said lever by means of a pin 21 and has a seat for a knife blade 22 and is vertically slidable in guides 23 in the inner faces of the standards 3. This knife has a concave cutting edge 24 conforming substantially to the shape of the tire, so that when the lever is forced down, the knife blade will contact with the walls of the tire with a shear cut and sever the same transversely into a series of independent sections. These sections are all substantially of the same size and to provide a uniform width of cut, I arrange stops on the discharge side of the machine consisting of bars 25 pivoted at 26 on the standards and adapted to swing into the path of the beads on the tire and arrest the feeding movement of the tire after each severing operation.

This machine is designed for cutting tires or shoes in which there is no metal reinforcing means, the severing blade cutting smoothly and easily through the fabric of the tire and separating it into a plurality of narrow faced sections which are adapted to fit the surface of a tire in use and when joined together at the ends, form a substantial guard for the tire.

For different sizes of tires the blocks and the part 10 may be changed or adjusted to suit different conditions of use and in various ways the details of construction herein shown and described may be modified and still be within the scope of my invention.

I claim as my invention:

1. A machine of the class described comprising a base, a tire seat mounted thereon and having a surface conforming substantially to the inner surface of a tire shoe to provide a substantial support therefor, said base having upright standards adjacent the end of said seat and between which standards the end of the tire to be severed is inserted, resting upon said seat, and a severing knife mounted to cut the tire transversely into a series of guard sections.

2. A machine of the class described comprising a base having a seat thereon for the main body of the tire to be severed and curved surfaces to receive and support the beads of the tire, and a vertically moving knife mounted to engage and sever the tire transversely adjacent to said supports.

3. A machine of the class described comprising a base having a seat adapted to enter and support a tire to be severed transversely, blocks mounted on said base and having surfaces adapted to engage and support the tire beads, stops for limiting the feeding movement of the tire on its support, and a severing knife having vertical guides upon opposite sides of said seat for cutting the tire transversely into a series of guard sections.

4. A machine of the class described comprising a base having an upright plate thereon, standards upon opposite sides of said plate, a block secured to said plate and having a shoulder at its upper end, a tire seat mounted on said base and having a tongue to rest upon the shoulder of said block and bear against said plate, said seat having a socket in its underside and a screw adjustably mounted in said base and loosely fitting within said socket, and a knife mounted to move vertically near said plate between said standards to sever the projecting end of a tire resting on said seat.

5. A machine of the class described comprising a base, a tire seat thereon, a severing knife having a curved cutting edge for engaging and severing the tire transversely, blocks removably mounted, one above the other, on each side of said seat, the upper blocks having curved seats to receive the beads of the tire and the lower blocks being removable to adapt the device for tires of different sizes.

6. A machine of the class described comprising a base having upright standards and a tire seat formed between said standards and spaced therefrom and having an upper surface adapted to receive the tire to be severed, blocks arranged in the space between said seat and said standards and having surfaces to fit the surface of the tire beads, and a severing knife mounted to move vertically in said standards and cut said tire into transverse sections.

7. A machine of the class described comprising a base having a seat thereon for the tire tread, and surfaces to conform to and support the tire beads in combination with a vertically movable severing knife.

In witness whereof, I have hereunto set my hand this 28" day of February 1922.

ERICK O. FELLROTH.